(12) United States Patent
Osaka et al.

(10) Patent No.: US 10,080,995 B2
(45) Date of Patent: Sep. 25, 2018

(54) MEMBRANE SUPPORT MATERIAL

(75) Inventors: Katsumi Osaka, Tokushima (JP); Akihiro Okubo, Awa (JP); Daisuke Fujieda, Itano-gun (JP)

(73) Assignee: AWA PAPER MFG. CO., LTD., Tokushima (JP)

( * ) Notice: Subject to any disclaimer, the term of this patent is extended or adjusted under 35 U.S.C. 154(b) by 1327 days.

(21) Appl. No.: 13/996,274

(22) PCT Filed: Dec. 23, 2011

(86) PCT No.: PCT/JP2011/079950
§ 371 (c)(1),
(2), (4) Date: Jul. 23, 2013

(87) PCT Pub. No.: WO2012/086820
PCT Pub. Date: Jun. 28, 2012

(65) Prior Publication Data
US 2013/0295339 A1    Nov. 7, 2013

(30) Foreign Application Priority Data

Dec. 24, 2010 (JP) ................................. 2010-288945

(51) Int. Cl.
*B01D 69/10* (2006.01)
(52) U.S. Cl.
CPC ........... *B01D 69/10* (2013.01); *B01D 69/105* (2013.01); *Y10T 428/24628* (2015.01)
(58) Field of Classification Search
None
See application file for complete search history.

(56) References Cited

U.S. PATENT DOCUMENTS

| | | | | |
|---|---|---|---|---|
| 4,728,394 A | * | 3/1988 | Shinjou | .................... D04H 1/54 |
| | | | | 162/129 |
| 6,919,026 B2 | * | 7/2005 | Hama | .................... B01D 69/10 |
| | | | | 162/157.3 |

(Continued)

FOREIGN PATENT DOCUMENTS

| EP | 1044719 A1 | * 10/2000 | ............. B01D 69/10 |
|---|---|---|---|
| EP | 1 044 719 | 12/2008 | |

(Continued)

OTHER PUBLICATIONS

International Search Report dated Mar. 19, 2012 in International Application No. PCT/JP2011/079950.

*Primary Examiner* — Maria V Ewald
*Assistant Examiner* — Daniel P Dillon
(74) *Attorney, Agent, or Firm* — Wenderoth, Lind & Ponack, L.L.P.

(57) ABSTRACT

A membrane support material is support material for adhering a membrane to a membrane attachment surface. A plurality of non-woven fiber sheets, which are three-dimensional fiber aggregates, are layered together and thermal and pressure processed to bond fibers of the non-woven fiber sheets and form a single sheet of support material. Each layer of non-woven fiber sheet has a different longitudinal-to-lateral tensile strength ratio (k), which is the ratio (f2/f1) of the tensile strength in the lengthwise direction (f2) to the tensile strength in the width direction (f1), and in the thermal and pressure processed state, the support material membrane attachment surface has curvature in the lateral (width) direction with an outward protruding (convex) center region.

16 Claims, 8 Drawing Sheets

(56) References Cited

U.S. PATENT DOCUMENTS

2002/0056535 A1     5/2002   Hama et al.
2005/0176330 A1     8/2005   Hama et al.

FOREIGN PATENT DOCUMENTS

| JP | 60-238103 | 11/1985 |
| JP | 61-222506 | 10/1986 |
| JP | 10-225630 | 8/1998 |
| JP | 2001-79368 | 3/2001 |
| JP | 2002-95937 | 4/2002 |
| JP | 2011-161344 | 8/2011 |

* cited by examiner

MEMBRANE SUPPORT MATERIAL

BACKGROUND OF THE INVENTION

1. Field of the Invention

The present invention relates to membrane support material having a membrane attachment surface on one side to adhere a membrane, and in particular, to membrane support material optimally suited for adhering a separation membrane to the membrane attachment surface.

2. Description of the Related Art

Two-layer support material having high-density non-woven fiber material (also known as non-woven fabric or bonded-fiber material) laminated with low-density non-woven fiber material has previously been proposed as separation membrane (permeable membrane for separation processing) support material (see Japanese Laid-Open Patent Publication SHO-60-238103 (1985) and Japanese Laid-Open Patent Publication SHO-61-222506 (1986)). In contrast, single-layer support material has also been advocated to simplify the fabrication process and reduce manufacturing cost (see Japanese Laid-Open Patent Publication HEI-10-225630 (1998)).

Accompanying a widening market for separation membrane applications, price competition has grown intense and resulted in strong demand for material cost reduction including membrane support material cost reduction. In addition, for separation membrane used in a spiral-wound membrane module, it is advantageous from a module performance perspective to incorporate a large separation membrane area in a given volume. Consequently, thin materials including thin support material are in demand. To satisfy both of these demands, it is most effective to make the support material thin and reduce its weight per unit area.

However, when the support material is thinned and its weight per unit area reduced, robustness with respect to bending and twisting decreases. When separation membrane is coated on one side of the support material, lateral curvature (curvature in the width direction) increases due to separation membrane contraction (compressive shrinkage) during solidification. Specifically, this generates detrimental curvature or curling and forms a central concave region.

During subsequent processing when the separation membrane is cut into a flat sheet and layered onto flow-channel material, large lateral curvature can cause malfunctions such as the inability to proceed through subsequent production-line steps in an uninterrupted manner.

To resolve the problems described above, the present inventor and associates developed support material and method of manufacture capable of reducing lateral curvature when separation membrane is layered onto the support material (see Japanese Laid-Open Patent Publication 2002-9537). Here, it was noticed that lateral curvature could be reduced by controlling non-woven fiber support material manufacturing condition settings. Specifically, the cited method restrains lateral curvature within a tolerable range at roller transport during separation membrane formation by making the non-woven fiber longitudinal-to-lateral tensile strength ratio (k), which is the ratio (f2/f1) of non-woven fiber longitudinal tensile strength (f2) to lateral tensile strength (f1), a value from 2 to 1. However, even with this method, depending on support material weight per unit area and membrane formation conditions, sufficient reduction in lateral curvature is not obtained and subsequent processing malfunction can develop. In particular, when separation membrane is cut in the form of flat sheets of given size; it has the tendency to easily curl into cylindrical shapes. As a result, it can become impossible to eliminate malfunctions such as failure to properly pass through the next production line processing step.

The present invention was developed to resolve the types of prior art problems described above. Thus, it is a primary object of the present invention to provide membrane support material that can suppress lateral curvature when a membrane is formed on the attachment surface and can reduce production line malfunctions while making the support material thin with a light weight per unit area. It is another object of the present invention to provide membrane support material that can effectively prevent curling into cylindrical shapes due to contraction of a membrane formed on the attachment surface and can eliminate subsequent production line processing step malfunctions.

SUMMARY OF THE INVENTION

The membrane support material of the present invention is support material for adhering a membrane to a membrane attachment surface. The membrane support material is a laminate of a plurality of non-woven fiber sheets, which are three-dimensional fiber aggregates, and the fibers are joined together by thermal and pressure processing to form a sheet of support material. Each layer of non-woven fiber sheet has a different longitudinal-to-lateral tensile strength ratio (k), which is the ratio (f2/f1) of longitudinal tensile strength (f2) to lateral tensile strength (f1). In the thermal and pressure processed state, the support material has curvature in the lateral (width) direction and the membrane attachment surface has an outward protruding (convex) center region. In this patent description, the longitudinal direction of non-woven fiber sheet is the lengthwise direction of non-woven fiber made in sheet form with a given width, and indicates the direction of movement of non-woven fiber sheet through the production line. Further, in this patent description, the non-woven fiber sheet longitudinal-to-lateral tensile strength ratio (k) indicates the ratio (f2/f1) of non-woven fiber sheet longitudinal (lengthwise) tensile strength (f2) to lateral (in the width direction) tensile strength (f1).

The support material described above has the characteristic that with a membrane formed on its attachment surface, lateral curvature can be suppressed and production line malfunctions can be reduced while making the support material thin and reducing its weight per unit area. This is because when a plurality of non-woven fiber sheets having different longitudinal-to-lateral tensile strength ratios (f2/f1) is laminated and joined together by thermal and pressure processing, the attachment surface of the resulting support material is laterally curved with a convex center region prior to membrane formation. The reason the support material curves laterally with thermal and pressure processing is because it is a laminate of a plurality of non-woven fiber sheets each having a different longitudinal-to-lateral tensile strength ratio (k) (which is the ratio [f2/f1] of longitudinal tensile strength [f2] to lateral tensile strength [f1]). When the ratio (f2/f1) of longitudinal tensile strength (f2) to lateral tensile strength (f1) of a non-woven fiber sheet is large, there is a large amount of contraction (compressive shrinkage) in the width direction due to thermal and pressure processing. Consequently, support material formed by combining a plurality of non-woven fiber sheets by thermal and pressure processing curves laterally due to lamination of non-woven fiber sheets having different longitudinal-to-lateral tensile strength ratios (k); and specifically, non-woven fiber sheet with a large longitudinal-to-lateral tensile strength ratio (k) has higher lateral contraction forces than non-woven fiber sheet with a small longitudinal-to-lateral tensile strength ratio (k). Therefore, the attachment surface side can be laterally curved with a convex center region by making the longitudinal-to-lateral tensile strength ratio (k) of the non-woven fiber sheet on the non-attachment side of the support material greater than that of the non-woven fiber sheet on the attachment surface side. For this type of support material that is pre-curved in the width direction with an outward protruding membrane attachment surface, formation of a membrane on the convex attachment surface can cancel lateral curvature caused by contraction during solidification of the coated membrane. Specifically, curvature in the width direction caused by membrane contraction can be suppressed by membrane formation on support material having reverse curvature established by thermal and pressure processing, and this can reduce production line malfunctions in subsequent processing steps. In particular, curvature can be induced in the support material due to difference in the lateral contraction of its constituent non-woven fiber sheets in the same manner as bimetal distortion due to difference in the coefficient of expansion of its constituent metals. Consequently, the present invention has the feature that lateral curvature of thermal and pressure processed support material can be precisely controlled by adjusting the difference between the longitudinal-to-lateral tensile strength ratios (k) of the non-woven fiber sheet layers, and the direction (concave or convex) of curvature can be set in a stable and reliable manner.

The membrane established on the attachment surface of the membrane support material of the present invention can be a separation membrane. When a separation membrane is formed on the attachment surface of this support material, curvature that makes the attachment surface concave due to membrane contraction during formation can be suppressed and malfunction during separation membrane fabrication can be avoided.

The membrane support material of the present invention can be a laminate of two non-woven fiber sheet layers. The support material has the simplest structure that allows the membrane attachment surface to be curved in the width direction with a protruding center region while making the support material thin and reducing its weight per unit area.

In the membrane support material of the present invention, the non-woven fiber sheet can be wet-processed non-woven fiber material. Since the non-woven fiber sheet in this support material is wet-processed (via a wet-laid process such as paper making), it has the characteristic that fiber can be uniformly distributed throughout the entire support material.

In the membrane support material of the present invention, the non-woven fiber sheet can be a dry-processed three-dimensional aggregate of non-woven fiber. Since the non-woven fiber sheet in this support material is a dry-processed three-dimensional aggregate, it has the characteristic that the overall strength of the support material can be increased.

In the membrane support material of the present invention, the non-woven fiber sheet can include wet-processed non-woven fiber material and dry-processed three-dimensional non-woven fiber aggregate material.

In the membrane support material of the present invention, the difference between non-woven fiber sheet longitudinal-to-lateral tensile strength ratios (k) can be greater than or equal to 1.5, and preferably greater than or equal to 2.5.

In the membrane support material of the present invention, the non-woven fiber sheet can be made with polyester or polyolefin fibers.

The membrane support material of the present invention, which is a laminate of non-woven fiber sheets, can have a weight per unit area of 50 to 100 g/m$^2$, a thickness of 50 to 150 μm, and a porosity (permeability) of 0.3 to 6.0 cc/cm$^2$/sec.

DETAILED DESCRIPTION OF THE EMBODIMENTS

Figure 1:
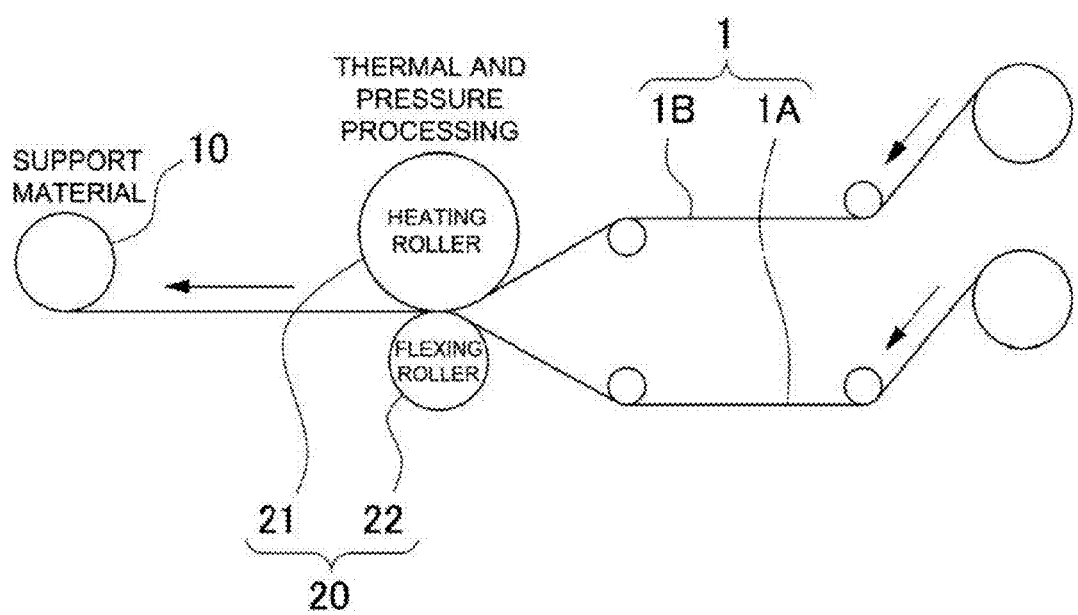
FIG. 1 is a schematic showing thermal and pressure processing of membrane support material for an embodiment of the present invention.

The following describes embodiments of the present invention based on the figures. However, the following embodiments are merely specific examples of membrane support material representative of the technology associated with the present invention, and the membrane support material of the present invention is not limited to the embodiments described below. Further, components cited in the claims are in no way limited to the components indicated in the embodiments.

As an embodiment of the present invention, the following is a detailed description of support material having an attachment surface on one side where a separation membrane is adhered. As a separation membrane, a polymer resin separation membrane is established on the attachment surface of the support material. For example, separation membranes such as micro-filter membranes, ultra-filter membranes, nano-filter membranes, and reverse osmosis membranes are appropriate. In the processing that forms the polymer membrane for these types of separation membranes, forces applied during solidification of the coated polymer resin tend to curve the attachment surface and form a central concave (recessed) region. However, the attachment surface of the support material of the present invention is pre-curved with a protruding center region prior to polymer membrane formation. Consequently, even if a polymer resin layer is formed on the attachment surface and forces due to polymer resin contraction during solidification act to curve the attachment surface and recess the center region, the separation membrane lateral curvature is suppressed by support material with opposing curvature. Specifically, polymer resin contraction forces (that tend to curve the attachment surface in a concave manner) are cancelled out by support material tensile forces that curve the attachment surface in a convex manner. However, the membrane formed on the attachment surface of the support material of the present invention does not necessarily have to be a separation membrane. For example, a plastic film that is not a separation membrane can be established on the support material attachment surface by solidifying plastic applied in an unhardened paste form. This type of membrane can be used for purposes such as reinforcing the support material, smoothing the surface, or making the surface slippery (reducing friction).

A three-dimensional aggregate of fibers is wet or dry processed to form a non-woven fiber sheet. A plurality of non-woven fiber sheets is layered together, and treated by thermal and pressure processing to bond together non-woven fibers and form membrane support material in laminated sheet form. Further, when support material laminated sheet is thermal and pressure processed from a plurality of non-woven fiber sheets, lateral (in the width direction) curvature is established. To achieve this curvature, non-woven fiber sheets used in the different layers each have a different longitudinal-to-lateral tensile strength ratio (k), which is the ratio (f2/f1) of longitudinal (in the length direction) tensile strength (f2) to lateral (in the width direction) tensile strength (f1). Here, non-woven fiber sheets with different longitudinal-to-lateral tensile strength ratios (k) are used in the non-woven fiber sheet layers, and the longitudinal-to-lateral tensile strength ratio (k) of each layer is set by the longitudinal tensile strength (f2) divided by lateral tensile strength (f1).

When the longitudinal-to-lateral tensile strength ratio (k) of a non-woven fiber sheet is increased, contraction forces in the width direction due to thermal and pressure processing increase. This is because contraction in the weak tensile strength width direction is greater than contraction in the strong tensile strength length direction. Accordingly, by using non-woven fiber sheets with different longitudinal-to-lateral tensile strength ratios (k), a difference in lateral contraction results when the sheets are laminated with thermal and pressure processing and lateral curvature develops due to the difference in contraction. For example, if two non-woven fiber sheets with different longitudinal-to-lateral tensile strength ratios (k) are laminated together via thermal and pressure processing, a large amount of contraction occurs for the non-woven fiber sheet with low tensile strength in the width direction, which is the sheet with a high longitudinal-to-lateral tensile strength ratio (k), a small amount of contraction occurs for the non-woven fiber sheet with a low longitudinal-to-lateral tensile strength ratio (k), and lateral curvature results from that difference in contraction. By controlling the longitudinal-to-lateral tensile strength ratio (k) of each non-woven fiber sheet in support material formed by thermal and pressure processing a plurality of non-woven fiber sheet layers, the amount of lateral curvature can be quite accurately controlled. For example, a large amount of lateral curvature can be produced by making the difference between longitudinal-to-lateral tensile strength ratios (k) large, and conversely a small amount of lateral curvature can be produced by making the difference between longitudinal-to-lateral tensile strength ratios (k) small. A membrane formed on the attachment surface of support material contracts during solidification and curves the support material. By controlling lateral curvature by setting the difference between longitudinal-to-lateral tensile strength ratios (k) of constituent non-woven fiber sheets, support material curvature and membrane curvature due to contraction can be made to cancel out. This can suppress the curvature of support material that has a membrane formed on its attachment surface.

A non-woven fiber sheet is manufactured by various processing methods such as wet processing or dry processing. Preferably, the non-woven fiber sheet is made as a mixture of primary fiber (fiber) and binding fiber (binder). Synthetic fiber such as polyester fiber, polyolefin fiber, nylon fiber, aramid fiber, polyphenylene sulfide fiber, and polyvinyl alcohol fiber can be used separately or in combination as the fiber and binder in a non-woven fiber sheet. The non-woven fiber sheet including these types of binder fibers can be thermal and pressure processed to bond fiber crossing points and form a robust material. The non-woven fiber sheet can also be manufactured without including binding fiber. However, support material made by thermal and pressure processing of non-woven fiber sheets that include binding fiber is preferable as a membrane support material because strength is increased and the surface smoothed by melting binder together at intersections.

Polyester fiber is preferably used as binder. Use of polyester-family fiber as binder is optimal from an overall perspective that includes mechanical strength considerations, thermal process-ability, and cost. Fiber such as low melting point polyester fiber or unstretched polyester fiber can be used as polyester-family binding fiber. The melting point of polyester-family binding fiber is lower than that of the primary fiber and preferably is in the range from 110° C. to 260° C.

The amount of binding fiber included a non-woven fiber sheet is determined considering the degree of fiber bonding desired. The amount of binder is preferably 20 to 80 wt %, and more preferably 30 to 70 wt %. If the amount of binder included is too small, non-woven fiber sheet strength is reduced and it is difficult to obtain a smooth surface. If the amount of binder included is too large, fiber cost increases and it is difficult to obtain the proper porosity.

Fiber suitable for non-woven fiber sheet has a fiber diameter of 3 to 30 μm and preferably 5 to 20 μm, a fiber length of 1 to 25 mm and preferably 3 to 15 mm. In addition, support material formed by thermal and pressure processing a plurality of non-woven fiber sheet layers has a weight per unit area of 50 to 100 g/m$^2$, an overall thickness of 50 to 150 μm, and a porosity of 0.3 to 6.0 cc/cm$^2$/sec.

Non-woven fiber sheet is manufactured using fiber and binder with a mixture ratio as described above according to various fabrication methods such as wet processing or dry processing. Non-woven fiber sheet made by wet processing is characterized by overall uniformity in fiber distribution. However, it should go without saying that the present invention can use non-woven fiber sheet made by dry processing or by other fabrication methods. Further, laminated non-woven fiber sheets can be wet processed non-woven fiber sheet layered together with dry processed non-woven fiber sheet.

In wet processing (wet-laid process), fiber and binder is first uniformly dispersed in water. Next, a screening process is performed to remove foreign objects and clumps of material. Non-woven fiber sheet is fabricated with a final fiber concentration adjusted from 0.01 to 0.50 wt %. To obtain non-woven fiber sheet with more uniformity, additives such as dispersing agent, anti-foaming agent, hydrophilic agent, and anti-static agent can be included.

A plurality of non-woven fiber sheets fabricated separately via wet-laid process can be laminated together by thermal and pressure processing to form a single bonded fiber sheet as support material. Support material that is thermal and pressure processed from a plurality of non-woven fiber sheet layers formed by wet-laid process is characterized by superior uniformity. Further, support material, which is a plurality of non-woven fiber sheet layers bonded together as a single sheet by thermal and pressure processing, uses non-woven fiber sheet layers with different longitudinal-to-lateral tensile strength ratios (k) to establish lateral curvature due to contraction forces during thermal and pressure processing that are different in each layer.

However, a plurality of non-woven fiber sheets can also be layered together at a processing step within the wet-laid process, and that single multi-layer sheet can be thermal and pressure processed as support material. The plurality of non-woven fiber sheets can be layered together in a single type or multiple types of non-woven fiber manufacturing systems such as a cylinder mold having a screen (called a wire in paper manufacturing) on a circular cylinder, short wire, long wire, inclined-wire, and suction former (suction box inside a cylinder). The support material, which is a plurality of non-woven fiber sheets layered together within a process step to form a single sheet that is subsequently thermal and pressure processed, is also characterized by superior uniformity. Further, when the plurality of non-woven fiber sheets is layered together within a fabrication processing step, a different longitudinal-to-lateral tensile strength ratio (k) can be established for each layer to laterally curve the support material due to different contraction forces in each layer during thermal and pressure processing.

The longitudinal-to-lateral tensile strength ratios (k) of the non-woven fiber sheets, which are layered together, are adjusted within their respective processing steps. Formation of non-woven fiber sheet on an inclined-wire is suitable for adjusting the longitudinal-to-lateral tensile strength ratio (k). In this method, the longitudinal-to-lateral tensile strength ratio (k) can be adjusted by regulating parameters such as the concentration of the fiber slurry (stock), the speed of the slurry, the speed of the inclined-wire (continuous screen), and the angle of the inclined-wire. During non-woven fiber sheet processing, the fiber batt can be aggregated in a manner that makes fiber orientation in the lengthwise direction predominate over fiber orientation in the width direction. In that case, the result is strong longitudinal tensile strength, weak lateral tensile strength, and a large longitudinal-to-lateral tensile strength ratio (k). However, differences in longitudinal-to-lateral tensile strength ratios (k) can also be established in wet-laid processed non-woven fiber sheet using manufacturing systems such as a cylinder mold, short wire, long wire, or suction former.

Dry processed non-woven fiber sheet can be manufactured via a single method or multiple methods such as chemical bonding, thermal bonding, spun laying, needle-punching, stitch bonding, spun bonding, or melt-blowing. Dry processed non-woven fiber sheet is manufactured by supplying fibers in random orientation onto a moving conveyor belt. Non-woven fiber sheet longitudinal-to-lateral tensile strength ratio (k), which is the ratio (f2/f1) of tensile strength in the lengthwise direction (f2) to tensile strength in the width direction (f1), can be controlled by the conveyor belt speed or by establishing directionality in the supply of fibers. For example, by increasing conveyor belt speed, fiber aggregate can be formed with lengthwise oriented fibers predominating over laterally oriented fibers. In that case, longitudinal tensile strength becomes strong, lateral tensile strength becomes weak, and the longitudinal-to-lateral tensile strength ratio (k) can be made large.

When the longitudinal-to-lateral tensile strength ratio (k) of a non-woven fiber sheet is made large, contraction forces in the width direction (lateral compressive forces) become large during thermal and pressure processing. This is because tensile strength is greater in the longitudinal direction than in the lateral direction, and when binder fibers are bonded at crossing points via thermal and pressure processing, the non-woven fiber sheet contracts more easily in the width direction than in the length direction. Further, by making the difference between longitudinal-to-lateral tensile strength ratios (k) of the laminated non-woven fiber sheets greater than a given value, lateral curvature is established in the single sheet formed by bonding with thermal and pressure processing. If the longitudinal-to-lateral tensile strength ratios (k) of the laminated non-woven fiber sheets are equal, contraction forces after single sheet formation by thermal and pressure processing are equal and no lateral curvature results. The surface of the support material of the present invention on which a membrane is formed is curved with a protruding center region due to thermal and pressure processing of a plurality of non-woven fiber sheet layers. After thermal and pressure processing to laminate the non-woven fiber sheet layers, contraction forces are applied in the lateral direction on both the membrane attachment surface and on the opposite (non-attachment surface) side. Accordingly, contraction forces acting on the non-attachment side are adjusted greater than contraction forces acting on the attachment surface side to curve the non-attachment surface in the width direction with a central recessed region and curve the attachment surface in the width direction with a central protruding region. Therefore, the longitudinal-to-lateral tensile strength ratio (k1) of the non-woven fiber sheet laminated on the non-attachment side is adjusted to be greater than the longitudinal-to-lateral tensile strength ratio (k2) of the non-woven fiber sheet laminated on the attachment surface side to make contraction forces acting on the non-attachment surface greater than those acting on the attachment surface.

Support material lateral curvature due to contraction with thermal and pressure processing is controlled by the difference between longitudinal-to-lateral tensile strength ratios (k) of the non-woven fiber sheets laminated together. If the difference between longitudinal-to-lateral tensile strength ratios (k) of the non-woven fiber sheet layers is too small, little support material lateral curvature results and curvature due to membrane contraction cannot be cancelled out. Accordingly, the difference between longitudinal-to-lateral tensile strength ratios (k) of the non-woven fiber sheet layers is preferably made greater than or equal to 1.5 and more preferably made greater than or equal to 2.5. Conversely, if the difference between longitudinal-to-lateral tensile strength ratios (k) of the non-woven fiber sheet layers is too large, forces tending to curve the support material due to thermal and pressure processing become too strong and wrinkles develop or the material cannot pass smoothly onto rollers. Therefore, the difference between longitudinal-to-lateral tensile strength ratios (k) of the layers is preferably made less than or equal to 15 and more preferably made less than or equal to 10. However, since the amount of contraction of all membranes is not equal, the difference between longitudinal-to-lateral tensile strength ratios (k) of the non-woven fiber sheets is set to an optimal value considering the amount of contraction of the membrane to be formed.

Since the longitudinal-to-lateral tensile strength ratio (k) of non-woven fiber sheet made by wet-processing is generally greater than 1, the longitudinal-to-lateral tensile strength ratio (k1) of non-woven fiber sheet layered on the opposite side from the membrane attachment surface is preferably made greater than or equal to 2.5 and more preferably made greater than or equal to 3.5 to increase the contraction forces resulting from thermal and pressure processing. In addition, the longitudinal-to-lateral tensile strength ratio (k2) of non-woven fiber sheet on the attachment surface side is made smaller than the longitudinal-to-lateral tensile strength ratio (k1) of non-woven fiber sheet layered on the opposite side by 1.5 or more and preferably 2.5 or more to laterally curve the attachment surface with a protruding center region.

A plurality of non-woven fiber sheets prepared as described above is layered together and combined into a single sheet by thermal and pressure processing with thermal press equipment. FIG. 1 shows one example of thermal press equipment 20. This figure shows continuous thermal and pressure processing of two non-woven fiber sheets 1 laminated together while passing between two rollers (calendaring). The thermal press equipment 20 shown in the figure is made up of two rollers, which are a heating roller 21 and a flexing roller 22, that sandwich and transport the non-woven fiber sheets 1. The degree of heat and pressure applied is controlled by adjusting the thermal press equipment heating roller 21 surface temperature, heating roller 21 and flexing roller 22 mutually applied pressure, and non-woven fiber sheet 1 transport speed, which is the pressure application time. However, thermal press equipment could also perform thermal and pressure processing with sheet transport and pressure applied by two heating rollers. Thermal and pressure processing is performed with a heating roller surface temperature of 150° C. to 260° C., and preferably 200° C. to 250° C. Pressure applied between the heating roller 21 and flexing roller 22 to sandwich the non-woven fiber sheets 1 is 40 to 250 kg/conducting material, and preferably 100 to 200 kg/cm. The non-woven fiber sheet transport speed is 10 to 100 m/min, and preferably 20 to 60 m/min.

In the thermal and pressure processing described above, the heating roller surface temperature, pressure applied between the two rollers, and non-woven fiber sheet transport speed are adjusted depending on support material specification requirements. If heating roller surface temperature is high, pressure between rollers is high, and transport speed is slow, a large amount of heat will be input to the support material. Conversely, if heating roller surface temperature is low, pressure between rollers is low, and transport speed is high, a small amount of heat will be input to the support material. By adeptly adjusting the conditions described above, and by controlling the diameter and distribution of fiber used as raw material in non-woven fiber sheet fabrication, optimally suited support material can be obtained.

Figure 2:
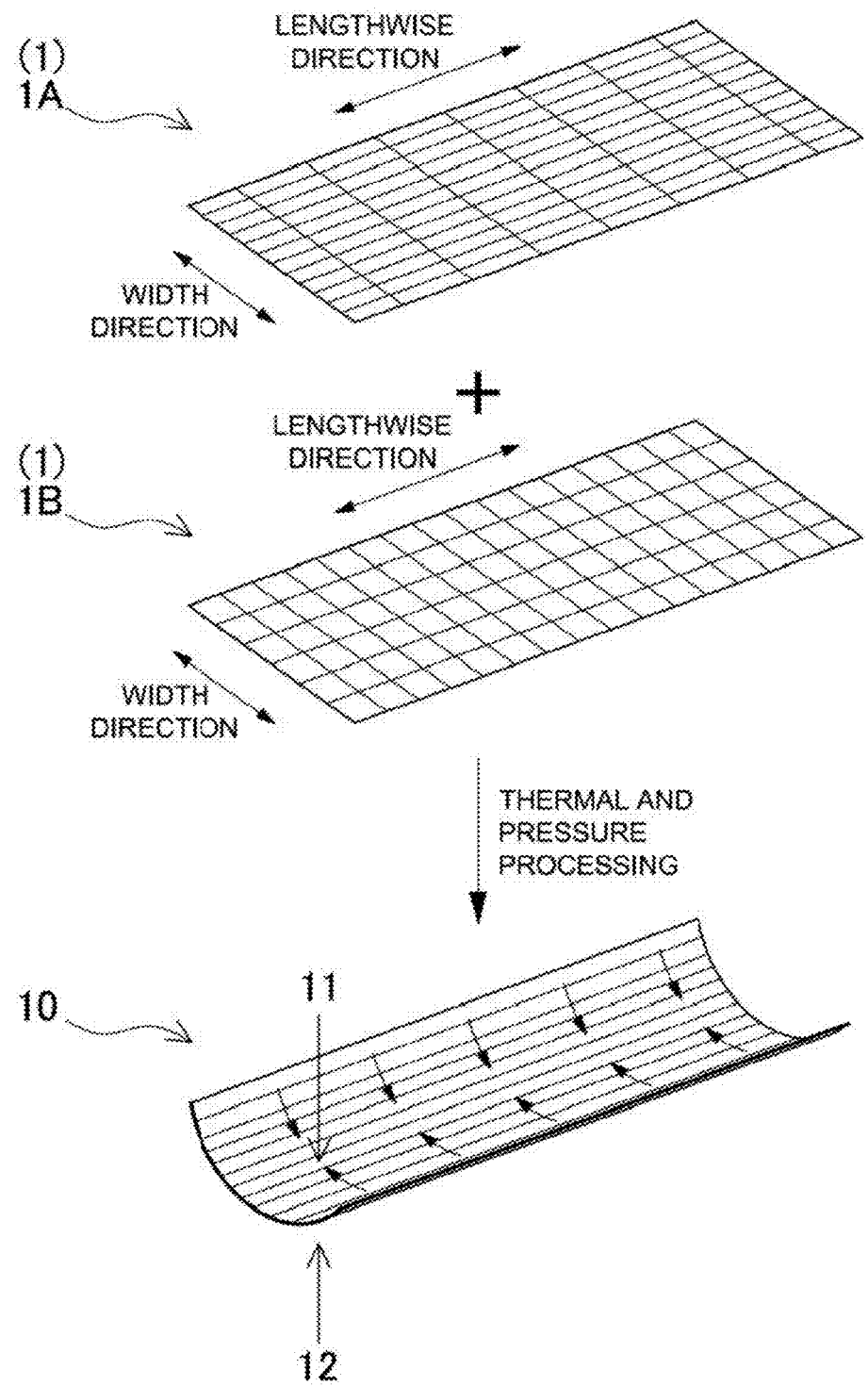
FIG. 2 is a simplified perspective view showing support material lateral curvature induced by thermal and pressure processing.
Figure 3A:
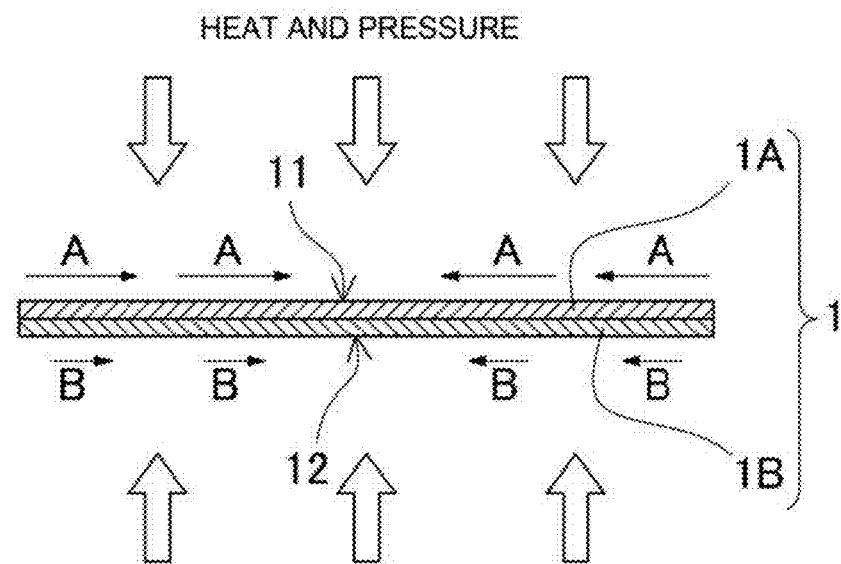
FIGS. 3A and 3B are simplified cross-sectional views showing the basic reason for support material lateral curvature induced by thermal and pressure processing.
Figure 3B:
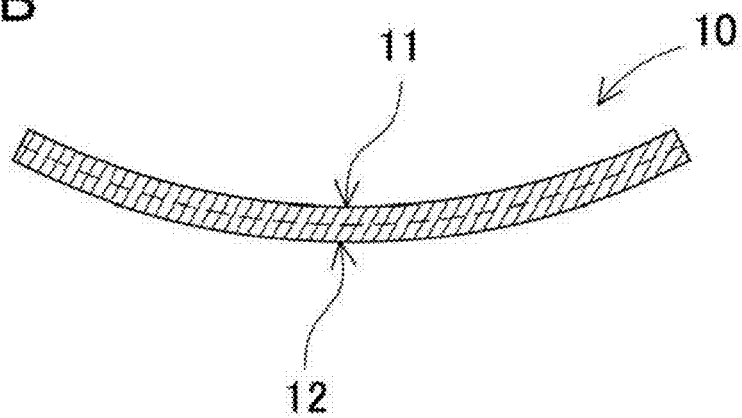

Turning to FIGS. 2 and 3, diagrams are shown that illustrate the principal behind support material lateral curvature, which results when two non-woven fiber sheets with different longitudinal-to-lateral tensile strength ratios (k) are laminated together as a single sheet by thermal and pressure processing. In these figures, the longitudinal-to-lateral tensile strength ratio (k1) of a first non-woven fiber sheet 1A that is layered on the non-attachment surface 11 side is adjusted so as to be greater than the longitudinal-to-lateral tensile strength ratio (k2) of a second non-woven fiber sheet 1B that is layered on the membrane attachment surface side of the support material 10. As shown by the arrows A and B in FIG. 3A, compressive (contraction) forces (arrows A) on the non-attachment surface side are greater than compressive forces (arrows B) on the attachment surface side. As shown in FIG. 3B, the support material 10 curves laterally with a protruding center region on the attachment surface 12 and a recessed center region on the non-attachment surface 11.

FIGS. 1-3 show formation of a single sheet of support material 10 from two non-woven fiber sheets 1 by thermal and pressure processing that laminates a first non-woven fiber sheet 1A on the non-attachment surface side and a second non-woven fiber sheet 1B on the membrane attachment surface side. However, although not illustrated, three non-woven fiber sheets can also be thermal and pressure processed to form support material having three layers laminated together. The lateral curvature of this type of three layer support material can be controlled by adjusting the longitudinal-to-lateral tensile strength ratio (k3) of the middle layer of non-woven fiber sheet in addition to the longitudinal-to-lateral tensile strength ratio (k1) of the first non-woven fiber sheet on the non-attachment side and the longitudinal-to-lateral tensile strength ratio (k2) of the second non-woven fiber sheet on the attachment surface side.

Further, although thermal and pressure processing described above thermally treats a plurality of non-woven fiber sheets with pressure application at the same time the sheets are laminated together, the non-woven fiber sheets can also be laminated together using sheets that have been pre-treated by heat and pressure in a previous process step. Specifically, a non-woven fiber sheet already thermally treated with pressure application can be stacked with another non-woven fiber sheet already thermally treated with pressure application and the two sheets can be laminated together by thermal and pressure processing.

Figure 4:
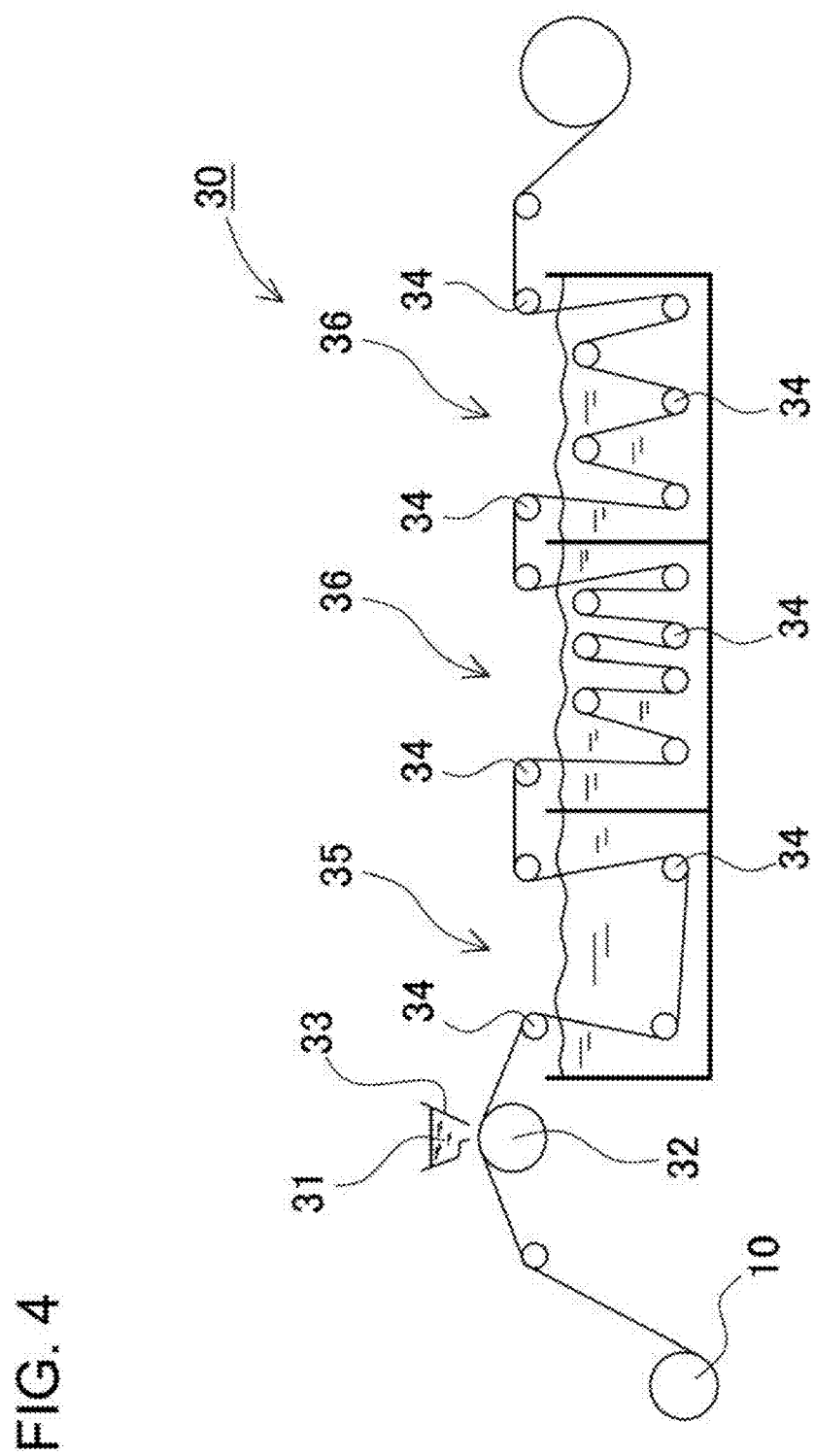
FIG. 4 is a schematic view showing membrane fabrication processing to produce a separation membrane on the membrane support material in an embodiment of the present invention.
Figure 5A:
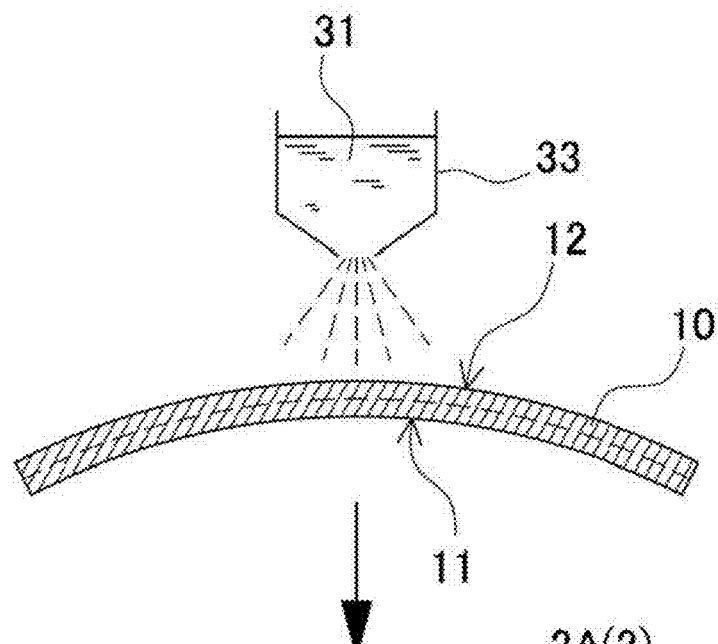
FIGS. 5A, 5B and 5C are simplified cross-sectional views showing the basic reason why lateral curvature due to membrane contraction during fabrication processing is suppressed.

Processing can form a membrane 2 on the attachment surface 12 of support material manufactured in the manner described above. FIGS. 4 and 5 show processing to coat the membrane attachment surface 12 with polymer solution 31 using general (purpose) membrane processing equipment 30 to form a semipermeable membrane 2A. As shown in these figures, polymer solution 31 is adhered onto the convex attachment surface 12 in thin-film form while support material 10 is moved over a rotating drum 32. A hopper 33 (solution trough) filled with polymer solution 31 is disposed above the rotating drum 32. The bottom of the hopper 33 is positioned in close proximity with the support material 10 attachment surface 12 to prevent polymer solution 31 from flowing off the support material 10 interface. To solidify polymer solution 31 coated on the support material 10, the support material 10 rotates off the drum 32 and into a solidifying bath 35 (gel tank). Support material 10 introduced into the solidifying bath 35 is transported by conveyer rollers 34 to soak while being immersed in the tank.

For example, the polymer solution 31 can be a 16.5 wt % concentration of polysulfone in N, N-dimethylformamide (DMF) solution. Since this polymer solution 31 has the property that polysulfone solidifies into a gel form when it comes in contact with water, it can be gelatinized by immersion in a solidifying bath 35 (gel tank) containing water. Subsequently, the support material 10 passes from the solidifying bath 35 for immersion in cleaning baths 36 (rinse tanks) where solidification continues while rinsing off residual DMF. In this manner, a 20 to 100 μm polysulfone semipermeable membrane 2A is formed on the support material 10 attachment surface 12.

Figure 5B:
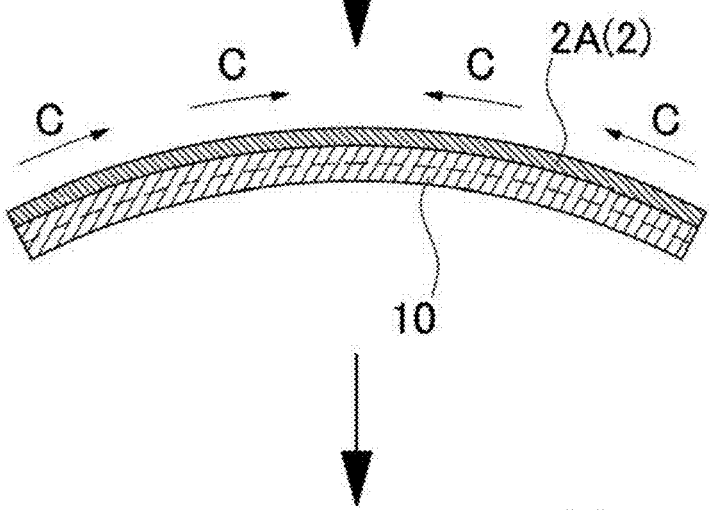
Figure 5C:
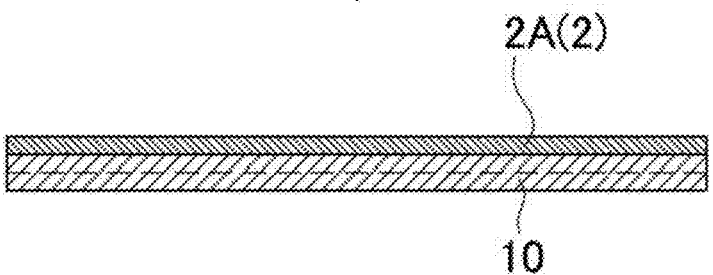

As shown in FIG. 5B, this processing gives the attachment surface 12 side of the support material 10 a tendency to curve (curl) in the width direction due to compressive forces (arrows C) applied by semipermeable membrane 2A formation on the attachment surface 12. In prior art support material, this (curling) tendency could result in a large amount of lateral curvature and prevent smooth transport over the rollers. In contrast, support material 10 of the present invention is pre-curved with lateral curvature that makes the center region of the attachment surface 12 protrude outward opposite the direction of curvature due to membrane 2 compressive forces during solidification. In this manner, by forming the membrane 2 on support material 10 with a laterally convex (reverse direction) pre-curved attachment surface 12, lateral curvature of the coated membrane 2 caused by contraction during solidification is cancelled out to suppress membrane 2 lateral curvature due to compressive forces. Specifically, by curvature established in the reverse direction with thermal and pressure processing, lateral curvature due to membrane contraction is suppressed to prevent large support material curvature. This allows smooth transport of the support material 10 and membrane 2 laminate over the rollers.

Subsequent processing coats the semipermeable membrane 2A with an active surface layer. Depending on the application, thin-films such as cellulose system materials including cellulose acetate, polyamide system materials, and polyimide system materials are used as the active layer. The active layer is formed thinner than the semipermeable membrane. Typically, semipermeable membrane at the stage prior to active layer coating is referred to as micro-filter membrane or ultra-filter membrane, and semipermeable membrane after active layer coating is referred to as nano-filter membrane or reverse osmosis membrane. Support material can be used to form various semipermeable membranes for many different applications in a variety of industries such as dairy, food, health, chemical, atomic energy, desalination and water purification, and dyeing and finishing.

Embodiments of the present invention are next described using concrete examples. However, the present invention is not limited to the following embodiments. Here, physical properties in the following examples are determined according to standards listed below. Further, unless otherwise indicated, percent (%) means weight percent (wt %).

Weight per unit area is measured according to Japanese Industrial Standard (JIS) P 8124.
Thickness is measured according to JIS P 8118.
Tensile strength is measured according to JIS P 8113.
The longitudinal-to-lateral tensile strength ratio (k) is determined with non-woven fiber sheet tensile strength in the lengthwise direction (f2) and tensile strength in the width direction (f1) measured according to JIS P 8113 and computed according to the following equation.

longitudinal-to-lateral tensile strength ratio ($k$)=tensile strength in the lengthwise direction ($f2$)/tensile strength in the width direction ($f1$)

Porosity is measured according to JIS L 1096 using a Frajour-type porosity tester.

First Embodiment

[First Non-Woven Fiber Sheet Processing]

56% polyethylene-terephthalate (PET) drawn fibers with a 7 μm diameter and 5 mm length and 44% unstretched PET fibers with a 11 μm diameter and 5 mm length were suitably dispersed in water inside a tank (called a chest in paper manufacturing). The fiber concentration of the aqueous slurry was adjusted to 0.05%, the slurry was delivered onto an inclined-wire, the flow-rate of the slurry and speed of the inclined-wire were adjusted to regulate the longitudinal-to-lateral tensile strength ratio (k), and fibers were aggregated to form wet-processed non-woven fiber sheet A. The processed sheet A was cut to a 50 mm width and gripped at a 180 mm interval by the tensile strength measurement tool. Tensile strength in the lengthwise direction (f2) and tensile strength in the width direction (f1) were measured, and the ratio (f2/f1) of longitudinal tensile strength (f2) to lateral tensile strength (f1), which is longitudinal-to-lateral tensile strength ratio (k), was determined. For sheet A, the weight per unit area was 38 g/m$^2$ and the longitudinal-to-lateral tensile strength ratio (k) was 6.7.

[Second Non-Woven Fiber Sheet Processing]

60% PET drawn fibers with a 12 μm diameter and 5 mm length and 40% unstretched PET fibers with a 11 μm diameter and 5 mm length were sufficiently dispersed in water inside the chest. The fiber concentration of the aqueous slurry was adjusted to 0.05%, the slurry was delivered onto an inclined-wire, the flow-rate of the slurry and speed of the inclined-wire were adjusted to regulate the longitudinal-to-lateral tensile strength ratio (k), and fibers were aggregated to form wet-processed non-woven fiber sheet F. The processed sheet F was cut to a 50 mm width and gripped at a 180 mm interval by the tensile strength measurement tool. Tensile strength in the lengthwise direction (f2) and tensile strength in the width direction (f1) were measured, and the ratio (f2/f1) of longitudinal tensile strength (f2) to lateral tensile strength (f1), which is longitudinal-to-lateral tensile strength ratio (k), was determined. For sheet F, the weight per unit area was 38 g/m$^2$ and the longitudinal-to-lateral tensile strength ratio (k) was 1.8.

[Thermal and Pressure Processing]

The two processed non-woven fiber sheets (A and F) were laminated together as shown in FIG. 1 by continuous thermal and pressure processing via thermal press equipment 20 made up of a heating roller 21 and a flexing roller 22. In this processing step, the surface temperature of the heating roller 21 was 230° C., pressure between the heating roller 21 and flexing roller 22 was 180 kg/cm, and sheet material feed rate (transport speed) was 27 m/min. Under these conditions, the two non-woven fiber sheets were thermal and pressure processed into a single sheet.

Figure 6:
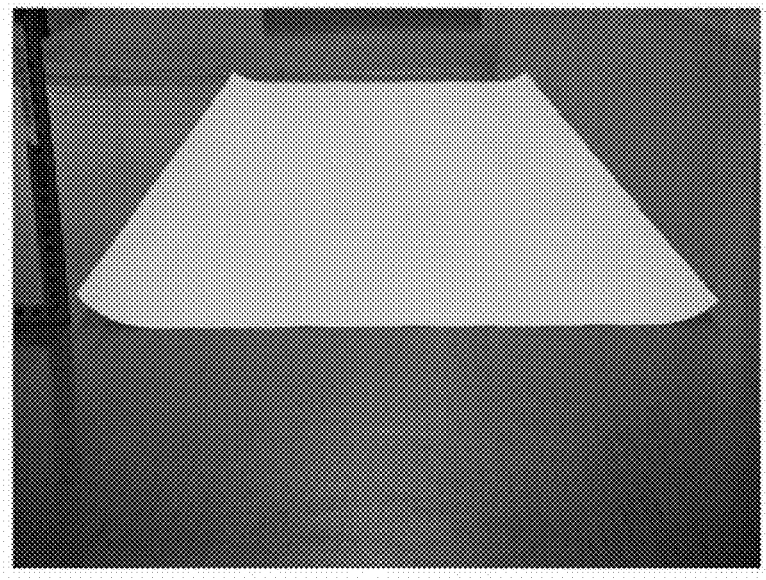
FIG. 6 is a photograph of membrane support material for the first embodiment of the present invention.

Support material for the first embodiment processed as described above had a weight per unit area of 78 g/m$^2$, a thickness of 93 μm, and a porosity of 0.8 cc/cm$^2$/sec. Further, support material was cut to a 15 mm width and gripped at a 180 mm interval by the tensile strength measurement tool to measure tensile strength in the lengthwise direction (f2) and tensile strength in the width direction (f1). The longitudinal-to-lateral tensile strength ratio (k) was determined to be 3.5. Support material was also cut to a 400 mm width and 1000 mm length to determine the amount of lateral curvature. This support material was laterally curved with a protruding (convex) center region on the non-woven fiber sheet F side, and a recessed (concave) center region on the non-woven fiber sheet A side. FIG. 6 shows a photograph of this support material. In this photograph, the support material was placed on a horizontal surface, the bottom surface was the non-woven fiber sheet F side, and the upper surface was the non-woven fiber sheet A side. As can be seen from this photograph, the processed support material had curvature that made both edges on the width direction sides lift off the horizontal surface approximately 20 mm.

Second Embodiment

Except for second non-woven fiber sheet processing where wet-processed non-woven fiber sheet E with a weight per unit area of 38 g/m$^2$ and longitudinal-to-lateral tensile strength ratio (k) of 3.6 was fabricated, this embodiment is the same as the first embodiment. First non-woven fiber sheet processing to produce sheet A with a weight per unit area of 38 g/m$^2$ and longitudinal-to-lateral tensile strength ratio (k) of 6.7 was the same as in the first embodiment. The two processed non-woven fiber sheets (A and E) were laminated together with the heating roller 21 and flexing roller 22 of the thermal press equipment 20 to form a single sheet via thermal and pressure processing under the same conditions as in the first embodiment.

Support material for the second embodiment processed as described above had a weight per unit area of 78 g/m$^2$, a thickness of 93 μm, and a porosity of 0.7 cc/cm$^2$/sec. Further, support material was cut to a 15 mm width and gripped at a 180 mm interval by the tensile strength measurement tool to measure tensile strength in the lengthwise direction (f2) and tensile strength in the width direction (f1). The longitudinal-to-lateral tensile strength ratio (k) was determined to be 4.5. Support material was also cut to a 400 mm width and 1000 mm length to determine the amount of lateral curvature. This support material was laterally curved with a protruding (convex) center region on the non-woven fiber sheet E side, and a recessed (concave) center region on the non-woven fiber sheet A side. When this support material was placed on a horizontal surface with the non-woven fiber sheet E side as the bottom surface and the non-woven fiber sheet A side as the upper surface, the support material had curvature that made both edges on the width direction sides lift off the horizontal surface approximately 12 mm.

Third Embodiment

Except for first non-woven fiber sheet processing where wet-processed non-woven fiber sheet B with a weight per unit area of 38 g/m$^2$ and longitudinal-to-lateral tensile strength ratio (k) of 3.6 was fabricated, this embodiment is the same as the first embodiment. Second non-woven fiber sheet processing to produce sheet F with a weight per unit area of 38 g/m$^2$ and longitudinal-to-lateral tensile strength ratio (k) of 1.8 was the same as in the first embodiment. The two processed non-woven fiber sheets (B and F) were laminated together with the heating roller 21 and flexing roller 22 of the thermal press equipment 20 to form a single sheet via thermal and pressure processing under the same conditions as in the first embodiment.

Support material for the third embodiment processed as described above had a weight per unit area of 78 g/m$^2$, a thickness of 93 μm, and a porosity of 0.9 cc/cm$^2$/sec. Further, support material was cut to a 15 mm width and gripped at a 180 mm interval by the tensile strength measurement tool to measure tensile strength in the lengthwise direction (f2) and tensile strength in the width direction (f1). The longitudinal-to-lateral tensile strength ratio (k) was determined to be 2.6. Support material was also cut to a 400 mm width and 1000 mm length to determine the amount of lateral curvature. This support material was laterally curved with a protruding (convex) center region on the non-woven fiber sheet F side, and a recessed (concave) center region on the non-woven fiber sheet B side. When this support material was placed on a horizontal surface with the non-woven fiber sheet F side as the bottom surface and the non-woven fiber sheet B side as the upper surface, the support material had curvature that made both edges on the width direction sides lift off the horizontal surface approximately 7 mm.

First Comparison Example

Except for second non-woven fiber sheet processing where wet-processed non-woven fiber sheet D with a weight per unit area of 38 g/m$^2$ and longitudinal-to-lateral tensile strength ratio (k) of 6.7 was fabricated, this comparison example is the same as the first embodiment. First non-woven fiber sheet processing to produce sheet A with a weight per unit area of 38 g/m$^2$ and longitudinal-to-lateral tensile strength ratio (k) of 6.7 was the same as in the first embodiment. The two processed non-woven fiber sheets (A and D) were laminated together with the heating roller 21 and flexing roller 22 of the thermal press equipment 20 to form a single sheet via thermal and pressure processing under the same conditions as in the first embodiment.

Support material for the first comparison example processed as described above had a weight per unit area of 79 g/m$^2$, a thickness of 92 μm, and a porosity of 0.5 cc/cm$^2$/sec. Further, support material was cut to a 15 mm width and gripped at a 180 mm interval by the tensile strength measurement tool to measure tensile strength in the lengthwise direction (f2) and tensile strength in the width direction (f1). The longitudinal-to-lateral tensile strength ratio (k) was determined to be 5.7. Although this support material was also cut to a 400 mm width and 1000 mm length to determine the amount of lateral curvature, no lateral curvature resulted.

Second Comparison Example

Except for first non-woven fiber sheet processing where wet-processed non-woven fiber sheet B with a weight per unit area of 38 g/m$^2$ and longitudinal-to-lateral tensile strength ratio (k) of 3.6 was fabricated, and second non-woven fiber sheet processing where wet-processed non-woven fiber sheet E with a weight per unit area of 38 g/m$^2$ and longitudinal-to-lateral tensile strength ratio (k) of 3.6 was fabricated, this comparison example is the same as the first embodiment. The two processed non-woven fiber sheets (B and E) were laminated together with the heating roller 21 and flexing roller 22 of the thermal press equipment 20 to form a single sheet via thermal and pressure processing under the same conditions as in the first embodiment.

Support material for the second comparison example processed as described above had a weight per unit area of 78 g/m$^2$, a thickness of 92 μm, and a porosity of 0.8 cc/cm$^2$/sec. Further, support material was cut to a 15 mm width and gripped at a 180 mm interval by the tensile strength measurement tool to measure tensile strength in the lengthwise direction (f2) and tensile strength in the width direction (f1). The longitudinal-to-lateral tensile strength ratio (k) was determined to be 3.7. Although this support material was also cut to a 400 mm width and 1000 mm length to determine the amount of lateral curvature, no lateral curvature resulted.

Third Comparison Example

Except for first non-woven fiber sheet processing where wet-processed non-woven fiber sheet C with a weight per unit area of 38 g/m$^2$ and longitudinal-to-lateral tensile strength ratio (k) of 1.8 was fabricated, this comparison example is the same as the first embodiment. Second non-woven fiber sheet processing to produce sheet F with a weight per unit area of 38 g/m² and longitudinal-to-lateral tensile strength ratio (k) of 1.8 was the same as in the first embodiment. The two processed non-woven fiber sheets (C and F) were laminated together with the heating roller 21 and flexing roller 22 of the thermal press equipment 20 to form a single sheet via thermal and pressure processing under the same conditions as in the first embodiment.

Support material for the third comparison example processed as described above had a weight per unit area of 79 g/m², a thickness of 94 µm, and a porosity of 1.0 cc/cm²/sec. Further, support material was cut to a 15 mm width and gripped at a 180 mm interval by the tensile strength measurement tool to measure tensile strength in the lengthwise direction (f2) and tensile strength in the width direction (f1). The longitudinal-to-lateral tensile strength ratio (k) was determined to be 1.8. Although this support material was also cut to a 400 mm width and 1000 mm length to determine the amount of lateral curvature, no lateral curvature resulted.

Properties of the support material fabricated in the first through third embodiments and the first through third comparison examples are shown in Table 1.

(DMF) solution, was coated onto the respective support material attachment surfaces and solidified into gel form by immersion in a solidifying bath (gel tank) containing water. Subsequently, the coated support material was immersed in cleaning baths (rinse tanks) where residual DMF was rinsed off while continuing solidification to form a separation membrane on each respective attachment surface. In this manner, membranes, which were 35 µm thick polysulfone layers, were formed on the attachment surfaces of support material for the first through third embodiments and the first through third comparison examples.

Support material for the first through third embodiments and the first through third comparison examples coated with separation membrane formed by the processing described above was cut into sheets with a 400 mm width and 500 mm length to determine the amount of lateral curvature caused by membrane contraction during solidification on the attachment surfaces. FIGS. 7-10 are photographs showing the lateral curvature of membrane-support material sheets for the first embodiment and the first through third comparison examples. These photographs show the support material

TABLE 1

|  |  |  | First Embodiment | Second Embodiment | Third Embodiment | First Compar. Example | Second Compar. Example | Third Compar. Example |
|---|---|---|---|---|---|---|---|---|
| First Non-Woven Fiber Sheet Process | Sheet Designation | — | A | A | B | A | B | C |
|  | Weight/Unit Area | g/m² | 38 | 38 | 38 | 38 | 38 | 38 |
|  | Long.-to-Lat. TSR (k) | — | 6.7 | 6.7 | 3.6 | 6.7 | 3.6 | 1.8 |
| Second Non-Woven Fiber Sheet Process | Sheet Designation | — | F | E | F | D | E | F |
|  | Weight/Unit Area | g/m² | 38 | 38 | 38 | 38 | 38 | 38 |
|  | Long.-to-Lat. TSR (k) | — | 1.8 | 3.6 | 1.8 | 6.7 | 3.6 | 1.8 |
| Long.-to-Lat. TSR (k) Difference |  | — | 4.9 | 3.1 | 1.8 | 0 | 0 | 0 |
| After Thermal and Pressure Processing | Weight/Unit Area | g/m² | 78 | 78 | 78 | 79 | 78 | 79 |
|  | Thickness | µm | 93 | 93 | 93 | 92 | 92 | 94 |
|  | Longitudinal TS (f2) | Kgf/15 mm | 13.1 | 14.1 | 12.1 | 15.3 | 13.7 | 11.1 |
|  | Lateral TS (f1) | Kgf/15 mm | 3.7 | 3.1 | 4.7 | 2.7 | 3.7 | 6.2 |
|  | Long.-to-Lat. TSR (k) | — | 3.5 | 4.5 | 2.6 | 5.7 | 3.7 | 1.8 |
|  | Porosity | cc/cm²/sec | 0.8 | 0.7 | 0.9 | 0.5 | 0.8 | 1.0 |

Here, TS = tensile strength and TSR = tensile strength ratio

[Membrane Fabrication]

Separation membranes were formed as described below on attachment surfaces of the support material produced for the first through third embodiments and the first through third comparison examples. Surfaces on the non-woven fiber sheet F sides were used as support material attachment surfaces for the first and third embodiments, and the surface on the non-woven fiber sheet E side was used as the support material attachment surface for the second embodiment. Surfaces on the non-woven fiber sheet D, E, and F sides were used as support material attachment surfaces for the first, second, and third comparison examples respectively. Separation membranes were formed with the general (purpose) membrane processing equipment 30 shown in FIG. 4. In this processing, polymer solution, which was a 16.5 wt % concentration of polysulfone in N, N-dimethylformamide placed on a horizontal surface with the separation membrane-laminated surface facing up.

Figure 7:
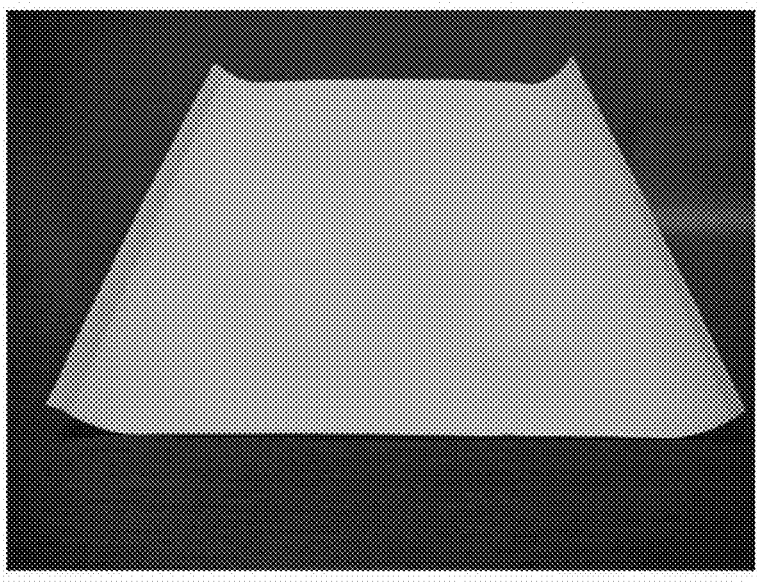
FIG. 7 is a photograph showing a separation membrane on the membrane support material for the first embodiment of the present invention.

As can be seen in the photograph of FIG. 7, when support material for the first embodiment was placed on a horizontal surface with the membrane-laminated side up, curvature only lifted the edges on the width direction sides approximately 20 mm off the horizontal surface. This support material was able to flow through subsequent processing steps without problems and no processing malfunctions were generated.

When support material for the second embodiment was placed on a horizontal surface with the membrane-laminated side up, curvature lifted the edges on the width direction sides approximately 25 mm off the horizontal surface. This support material was able to flow through subsequent processing steps without problems and no processing malfunctions were generated.

When support material for the third embodiment was placed on a horizontal surface with the membrane-laminated side up, curvature lifted the edges on the width direction sides approximately 30 mm off the horizontal surface. This support material was able to flow through subsequent processing steps without problems and no processing malfunctions were generated.

Figure 8:
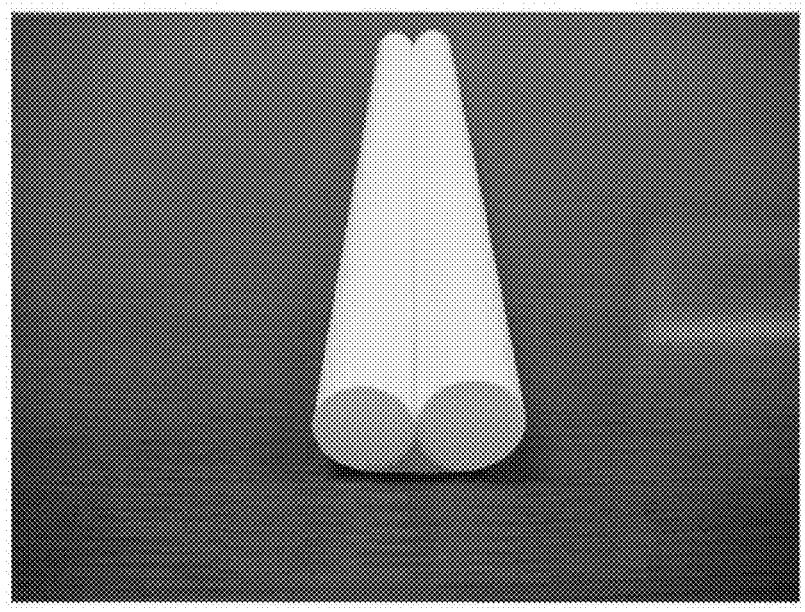
FIG. 8 is a photograph showing a separation membrane on the membrane support material for the first comparison example of the present invention.

As shown in the photograph of FIG. 8, when support material for the first comparison example was placed on a horizontal surface with the membrane-laminated side up, separation membrane contraction made both edges on the width direction sides roll into cylinders of approximately 30 mm diameter with the separation membrane on the inside. Because this support material curled into cylindrical shapes, it was unable to smoothly flow through subsequent processing steps and resulted in processing malfunction.

Figure 9:
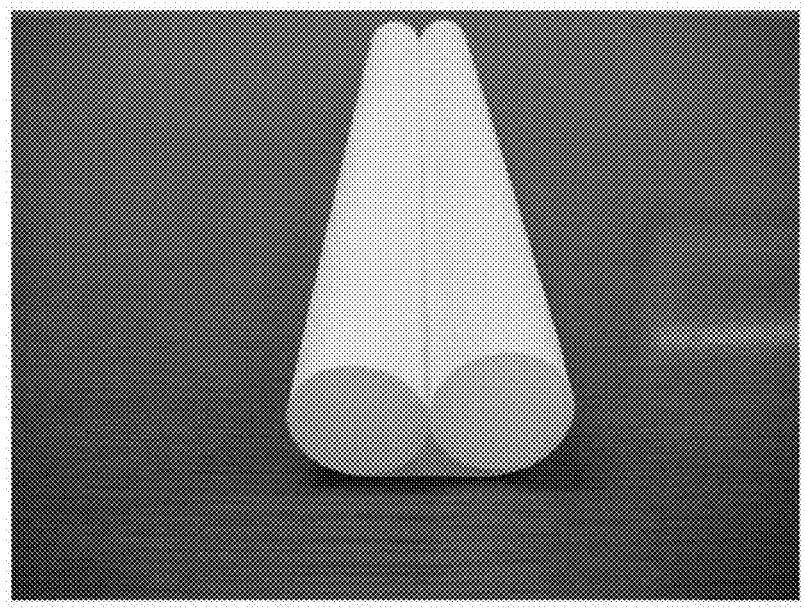
FIG. 9 is a photograph showing a separation membrane on the membrane support material for the second comparison example of the present invention.

As shown in the photograph of FIG. 9, when support material for the second comparison example was placed on a horizontal surface with the membrane-laminated side up, separation membrane contraction made both edges on the width direction sides roll into cylinders of approximately 35 mm diameter with the separation membrane on the inside. Because this support material curled into cylindrical shapes, it was unable to smoothly flow through subsequent processing steps and resulted in processing malfunction.

Figure 10:
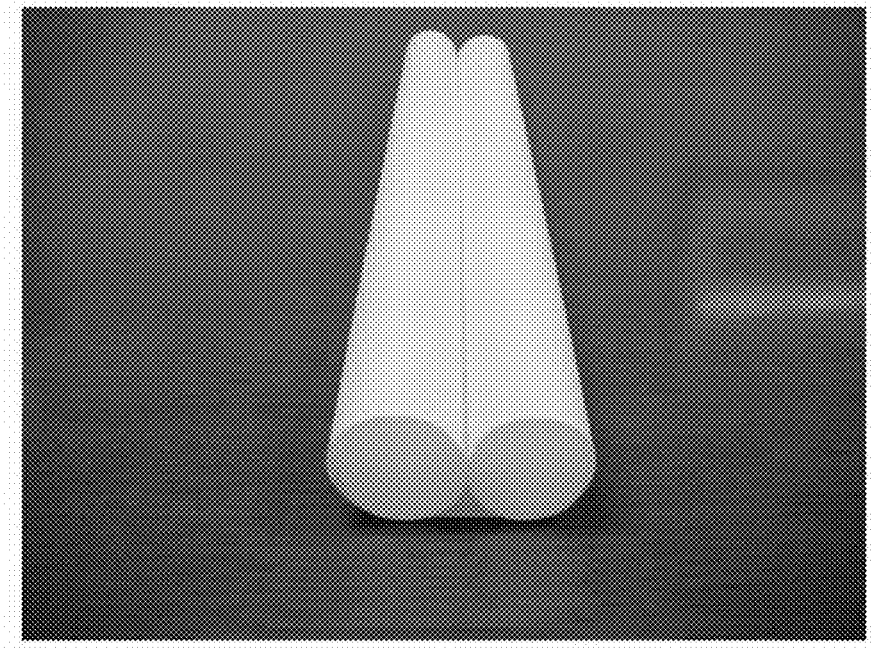
FIG. 10 is a photograph showing a separation membrane on the membrane support material for the third comparison example of the present invention.

As shown in the photograph of FIG. 10, when support material for the third comparison example was placed on a horizontal surface with the membrane-laminated side up, separation membrane contraction made both edges on the width direction sides roll into cylinders of approximately 40 mm diameter with the separation membrane on the inside. Because this support material curled into cylindrical shapes, it was unable to smoothly flow through subsequent processing steps and resulted in processing malfunction.

As described above, the amount of lateral curvature for separation membranes formed on support material for the first through third embodiments was minimal while lateral curvature for separation membranes formed on support material for the third, second, and first comparison examples resulted in curling that increased in that order. In particular, when the longitudinal-to-lateral tensile strength ratios (k) of support material for the embodiments and comparison examples are compared after thermal and pressure processing, even though the longitudinal-to-lateral tensile strength ratios (k) of the embodiments were greater than that of the third comparison example, the lateral curvature of the separation membrane laminated support material was much less for the embodiments. Further, even though the longitudinal-to-lateral tensile strength ratio (k) of support material for the first embodiment was essentially the same as that of the second comparison example, the lateral curvature of the first embodiment support material after separation membrane formation on the attachment surface was much less. From this result, it can be inferred that support material pre-curvature forming a protruding (convex) center region on the attachment surface was effective (for reducing post-membrane formation curvature).

The invention claimed is:

1. Membrane support material having an attachment surface for adhering a membrane, the membrane support material comprising:
   a plurality of laminated non-woven fiber sheets, which are three-dimensional aggregates of fibers,
   wherein fibers of the non-woven fiber sheets are bonded together by thermal and pressure processing,
   wherein each of the plurality of non-woven fiber sheets has a different longitudinal-to-lateral tensile strength ratio (k), which is the ratio (f2/f1) of the tensile strength in the longitudinal direction (f2) to the tensile strength in the lateral direction (f1),
   wherein the membrane support material is laterally curved with a convex center region in the attachment surface, and
   wherein the difference between longitudinal-to-lateral tensile strength ratios (k) of the non-woven fiber sheets is greater than or equal to 1.5,
   wherein the longitudinal-to-lateral tensile strength ratio (k1) of the non-woven fiber sheet layered on the opposite side from the membrane attachment surface is made greater than or equal to 2.5, and the longitudinal-to-lateral tensile strength ratio (k2) of the non-woven fiber sheet on the attachment surface side is made smaller than the longitudinal-to-lateral tensile strength ratio (k1) of the non-woven fiber sheet layered on the non-attachment surface side by 1.5 or more.

2. The membrane support material as cited in claim 1, wherein two non-woven fiber sheets are laminated together to form the membrane support material.

3. The membrane support material as cited in claim 2, wherein two non-woven fiber sheets are laminated together by thermal and pressure processing to form a single bonded fiber sheet of membrane support material.

4. The membrane support material as cited in claim 1, wherein non-woven fiber sheets to be pre-treated with thermal and pressure processing are layered together prior to heat and pressure application and thermal and pressure processed to form a single bonded fiber sheet of membrane support material.

5. The membrane support material as cited in claim 1, wherein three non-woven fiber sheets are laminated together to form the membrane support material.

6. The membrane support material as cited in claim 1, wherein the non-woven fiber sheets are wet-processed non-woven fiber material.

7. The membrane support material as cited in claim 3, wherein two separately wet-processed non-woven fiber sheets are laminated together via thermal and pressure processing to form the membrane support material.

8. The membrane support material as cited in claim 3, wherein a plurality of non-woven fiber sheets are layered together during wet-processing and the resulting single multi-layer sheet is thermal and pressure processed to form the membrane support material.

9. The membrane support material as cited in claim 1, wherein the non-woven fiber sheets are dry-processed three-dimensional aggregates of non-woven fiber.

10. The membrane support material as cited in claim 1, wherein the non-woven fiber sheets include wet-processed non-woven fiber material and dry-processed three-dimensional aggregates of non-woven fiber.

11. The membrane support material as cited in claim 6, wherein the difference between longitudinal-to-lateral tensile strength ratios (k) of the non-woven fiber sheets is greater than or equal to 2.5.

12. The membrane support material as cited in claim 7, wherein the longitudinal-to-lateral tensile strength ratio (k1) of the non-woven fiber sheet layered on the opposite side from the membrane attachment surface is made greater than or equal to 3.5, and the longitudinal-to-lateral tensile strength ratio (k2) of the non-woven fiber sheet on the attachment surface side is made smaller than the longitudinal-to-lateral tensile strength ratio (k1) of the non-woven fiber sheet layered on the non-attachment surface side by 2.5 or more.

13. The membrane support material as cited in claim 1, wherein the non-woven fiber sheet fibers are made up of polyester fibers or polyolefin fibers.

14. The membrane support material as cited in claim 8, wherein the non-woven fiber sheet fibers are made up of polyester fiber, polyolefin fiber, nylon fiber, aramid fiber, polyphenylene sulfide fiber, and polyvinyl alcohol fiber used separately or in combination.

15. The membrane support material, which is a laminate of a plurality of non-woven fiber sheets, as cited in in claim 1 has a weight per unit area of 50 to 100 g/m$^2$, a thickness of 50 to 150 µm, and a porosity of 0.3 to 6.0 cc/cm$^2$/sec.

16. Membrane support material having an attachment surface for adhering a membrane, the attachment surface being non-attached with the membrane, the membrane support material comprising:
   a plurality of laminated non-woven fiber sheets, which are three-dimensional aggregates of fibers,
   wherein fibers of the non-woven fiber sheets are bonded together by thermal and pressure processing,
   wherein each of the plurality of non-woven fiber sheets has a different longitudinal-to-lateral tensile strength ratio (k), which is the ratio (f2/f1) of the tensile strength in the longitudinal direction (f2) to the tensile strength in the lateral direction (f1), and
   wherein the membrane support material is laterally curved with a convex center region in the attachment surface, and
   wherein the difference between longitudinal-to-lateral tensile strength ratios (k) of the non-woven fiber sheets is greater than or equal to 1.5.

* * * * *